United States Patent
Durham et al.

(10) Patent No.: US 11,196,565 B2
(45) Date of Patent: *Dec. 7, 2021

(54) CRYPTOGRAPHIC SYSTEM MEMORY MANAGEMENT

(71) Applicant: INTEL CORPORATION, Santa Clara, CA (US)

(72) Inventors: David M. Durham, Beaverton, OR (US); Rajat Agarwal, Portland, OR (US); Siddhartha Chhabra, Portland, OR (US); Sergej Deutsch, Hillsboro, OR (US); Karanvir S. Grewal, Hillsboro, OR (US); Ioannis T. Schoinas, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/689,575

(22) Filed: Nov. 20, 2019

(65) Prior Publication Data

US 2020/0177392 A1 Jun. 4, 2020

Related U.S. Application Data

(63) Continuation of application No. 15/816,901, filed on Nov. 17, 2017, now Pat. No. 10,594,491, which is a
(Continued)

(51) Int. Cl.
*H04L 9/32* (2006.01)
*G06F 3/06* (2006.01)
(Continued)

(52) U.S. Cl.
CPC .......... *H04L 9/3242* (2013.01); *G06F 3/0622* (2013.01); *G06F 3/0659* (2013.01);
(Continued)

(58) Field of Classification Search
CPC ..... H04L 9/3242; H04L 9/0858; H04L 9/304; H04L 9/0631; G06F 3/0622;
(Continued)

(56) References Cited

U.S. PATENT DOCUMENTS 4,701,915 A * 10/1987 Kitamura .................. G06F 9/38
714/6.24
5,696,823 A * 12/1997 Blaze ................... G06Q 20/341
380/279
(Continued)

FOREIGN PATENT DOCUMENTS

WO     03030441 A2   4/2003
WO  2008020279 A2   2/2008
(Continued)

OTHER PUBLICATIONS

Henson et al., "Memory Encryption: A Survey of Existing Techniques", Computing Surveys (CSUR), Mar. 2014, vol. 26, Issue 4, ACM, USA, 32 pages.
(Continued)

*Primary Examiner* — Jason Chiang
(74) *Attorney, Agent, or Firm* — Kacvinsky Daisak Bluni PLLC

(57) ABSTRACT

In one example, a system for managing encrypted memory comprises a processor to store a first MAC based on data stored in system memory in response to a write operation to the system memory. The processor can also detect a read operation corresponding to the data stored in the system memory, calculate a second MAC based on the data retrieved from the system memory, determine that the second MAC does not match the first MAC, and recalculate the second MAC with a correction operation, wherein the correction operation comprises an XOR operation based on the data retrieved from the system memory and a replacement value for a device of the system memory. Furthermore, the
(Continued)

processor can decrypt the data stored in the system memory in response to detecting the recalculated second MAC matches the first MAC and transmit the decrypted data to cache thereby correcting memory errors.

21 Claims, 13 Drawing Sheets

Related U.S. Application Data continuation-in-part of application No. 14/998,054, filed on Dec. 24, 2015, now Pat. No. 9,990,249.

(51) Int. Cl.
| | |
|---|---|
| G06F 11/10 | (2006.01) |
| G06F 12/14 | (2006.01) |
| G06F 12/0886 | (2016.01) |
| G06F 21/78 | (2013.01) |
| H04L 9/06 | (2006.01) |
| H04L 9/08 | (2006.01) |
| H04L 9/30 | (2006.01) |
| G06F 21/14 | (2013.01) |
| G11C 29/52 | (2006.01) |
| G06F 21/79 | (2013.01) |
| G11C 29/44 | (2006.01) |

(52) U.S. Cl.
CPC .......... *G06F 3/0673* (2013.01); *G06F 11/108* (2013.01); *G06F 11/1068* (2013.01); *G06F 12/0886* (2013.01); *G06F 12/14* (2013.01); *G06F 12/1408* (2013.01); *G06F 21/78* (2013.01); *G06F 21/79* (2013.01); *G11C 29/52* (2013.01); *H04L 9/0631* (2013.01); *H04L 9/0643* (2013.01); *H04L 9/0894* (2013.01); *G06F 2212/401* (2013.01); *G11C 2029/4402* (2013.01); *H04L 2209/34* (2013.01)

(58) Field of Classification Search
CPC .. G06F 3/0659; G06F 3/0673; G06F 11/1068; G06F 11/108; G06F 12/14; G06F 12/0886; G06F 12/1408; G06F 21/78; G06F 21/1408

See application file for complete search history.

(56) References Cited

U.S. PATENT DOCUMENTS

| | | | | |
|---|---|---|---|---|
| 6,076,097 | A * | 6/2000 | London | G06F 7/588 380/46 |
| 6,543,022 | B1 * | 4/2003 | O'Connor | H03M 13/03 380/46 |
| 6,678,828 | B1 * | 1/2004 | Pham | G06F 3/0622 726/2 |
| 6,845,449 | B1 * | 1/2005 | Carman | H04L 1/0045 713/166 |
| 7,508,945 | B1 * | 3/2009 | Herrero | H04L 9/0656 380/268 |
| 7,774,681 | B2 * | 8/2010 | Earhart | G11B 27/327 714/763 |
| 8,819,455 | B2 | 8/2014 | Chhabra et al. | |
| 9,123,653 | B2 | 12/2015 | Durham et al. | |
| 9,319,179 | B1 * | 4/2016 | Ahirwar | H03M 13/13 |
| 9,405,920 | B1 * | 8/2016 | Roth | G06F 21/602 |
| 9,496,897 | B1 * | 11/2016 | Triandopoulos | H04L 9/002 |
| 9,614,666 | B2 | 4/2017 | Kishinevky et al. | |
| 10,205,470 | B2 | 2/2019 | El-Khamy et al. | |
| 10,372,528 | B1 * | 8/2019 | Anderson | G06F 11/1012 |
| 2004/0260995 | A1 * | 12/2004 | Allpress | H03M 13/2975 714/755 |
| 2005/0108555 | A1 * | 5/2005 | Sibert | H04L 9/0625 713/187 |
| 2005/0283566 | A1 * | 12/2005 | Callaghan | G06F 12/1408 711/104 |
| 2006/0080553 | A1 * | 4/2006 | Hall | G06F 21/6227 713/189 |
| 2006/0090114 | A1 * | 4/2006 | Duffy | G06K 9/00597 714/746 |
| 2007/0033417 | A1 * | 2/2007 | Gammel | H03M 13/116 713/189 |
| 2008/0232581 | A1 | 9/2008 | Elbaz et al. | |
| 2008/0313525 | A1 * | 12/2008 | Baker | G06F 11/1072 714/758 |
| 2009/0006886 | A1 * | 1/2009 | O'Connor | G06F 11/108 714/5.11 |
| 2009/0147947 | A1 * | 6/2009 | Ingimundarson | H04L 9/0643 380/29 |
| 2009/0150745 | A1 * | 6/2009 | Langner | H03M 13/3707 714/752 |
| 2010/0146303 | A1 | 6/2010 | Kothari et al. | |
| 2010/0223524 | A1 * | 9/2010 | Duggan | H04L 1/1812 714/751 |
| 2011/0041039 | A1 * | 2/2011 | Harari | G11C 29/76 714/773 |
| 2011/0085660 | A1 * | 4/2011 | Arava | H04L 9/0631 380/44 |
| 2011/0246862 | A1 * | 10/2011 | Graef | H04L 1/0057 714/785 |
| 2012/0297271 | A1 * | 11/2012 | Sommer | G06F 11/1048 714/766 |
| 2012/0311239 | A1 * | 12/2012 | Debout | H04L 9/0894 711/103 |
| 2014/0223197 | A1 * | 8/2014 | Gueron | G06F 21/72 713/193 |
| 2015/0161059 | A1 | 6/2015 | Durham et al. | |
| 2015/0236717 | A1 * | 8/2015 | El-Khamy | H03M 13/3905 714/807 |
| 2016/0112189 | A1 * | 4/2016 | Tomaru | H04L 9/06 380/268 |
| 2017/0012970 | A1 * | 1/2017 | Mandal | G06F 21/32 |
| 2017/0285976 | A1 | 10/2017 | Durham et al. | |

FOREIGN PATENT DOCUMENTS

| | | |
|---|---|---|
| WO | 2013002789 A1 | 1/2013 |
| WO | 2016160305 A1 | 10/2016 |
| WO | 2017112282 A1 | 6/2017 |
| WO | 2017112336 A1 | 6/2017 |

OTHER PUBLICATIONS

PCT International Search Report, PCT Application No. PCT/US2014/063986, dated Jul. 30, 2015, 3 pages.

Saileshwar et al., "Synergy: Rethinking Secury-Memory Design for Error-Correcting Memories", Paper accepted at HPCA-2018, Vienna, Austria, Feb. 27, 2018, 12 pages.

* cited by examiner

300

400

CRYPTOGRAPHIC SYSTEM MEMORY MANAGEMENT

CROSS-REFERENCE TO RELATED APPLICATIONS

The present application is a Continuation of U.S. patent application Ser. No. 15/816,901, which is a Continuation-In-Part of U.S. patent application Ser. No. 14/998,054 titled "Memory Integrity with Error Detection and Correction" filed on Dec. 24, 2015, the contents of which are incorporated by reference as though fully set forth herein.

TECHNICAL FIELD

This disclosure relates generally to managing data stored in memory and specifically, but not exclusively, to managing encrypted data stored in memory.

BACKGROUND

Computing devices can store data in a hierarchical manner in which data is transmitted between a larger storage device and smaller cache memory devices. In some examples, the data can be stored in an encrypted format in storage devices and unencrypted in smaller on-chip cache devices. In some examples, error correcting code (ECC) memory techniques can be used to detect errors in the data stored in memory devices. The ECC memory techniques can be deterministic and reversible, but not cryptographic.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
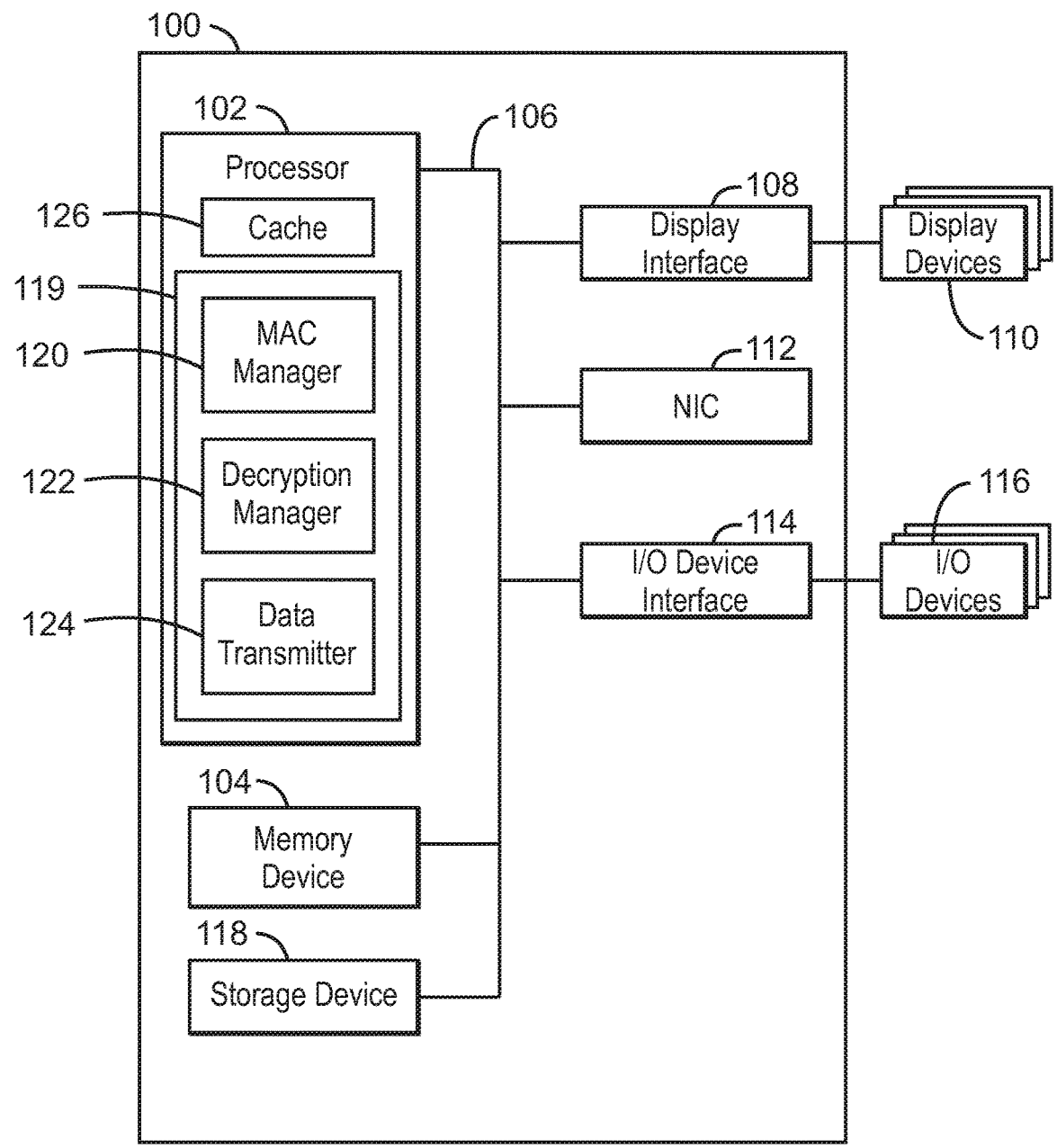
FIG. 1 illustrates a block diagram of a computing device that can manage encrypted data.

Error correcting code (ECC) memory can include using additional integrated circuits or devices or chips of physical memory to correct corrupted data, which can increase system costs. Additionally, ECC memory techniques may not be cryptographic. Techniques described herein provide for cryptographically secure ECC methods while maintaining error correcting capabilities to provide high performance memory that can mitigate random bit errors, memory based integrated circuit failures, and malicious adversaries. A memory based integrated circuit, also referred to herein as a device, can include any suitable hardware or logic chip for storing a predetermined number of bits in a storage device. The techniques described herein are cryptographically secure and perform the task of both error correction and providing memory integrity including support for multiple encryption keys/MKTME (Multi-Key Total Memory Encryption), replay prevention, and cryptographically strong data corruption detection even by a physical adversary. Additionally, the techniques described herein may not require the use of additional ECC memory, and, thus, reduce memory costs.

The techniques described herein include utilizing a cryptographically strong message authentication code (MAC) or HMAC (hash message authentication code) to replace ECC detection mechanisms with a statistical trial and error approach. In some examples, device correction codes are unrolled to test one device of memory at a time against the secure hash, which can identify the memory device containing errors and which bits flipped (up to a fully corrupted device). Unrolling, as referred to herein, can include performing an XOR operation or any other suitable logic operation on data stored in integrated circuits in a memory device. In some examples, when combined with total memory encryption (TME/Multi-Key TME), heuristics can help identify potentially corrupted plaintext blocks given their entropy as errors altering the ciphertext stored in memory will result in random plaintexts when decrypted. Alternatively, compression can be used to encode detection codes (e.g. Reed-Solomon) within data cache lines to identify/locate corrupted memory locations and reduce the cost/amount of physical memory needed to store these codes.

In some embodiments, a computing device can store a first message authentication code (MAC) based on data stored in system memory in response to a write operation to the system memory. A MAC as referred to herein can include any suitable message authentication code involving a cryptographic hash function and a secret cryptographic key. In some embodiments, the computing device can also detect a read operation corresponding to the data stored in the system memory and calculate a second MAC based on the data stored in the system memory. The computing device can also determine that the second MAC does not match the first stored MAC and recalculate the second MAC subsequent to a correction operation, wherein the correction operation comprises an XOR operation based on the data stored in the system memory and a replacement value for a device of the system memory. Furthermore, the computing device can decrypt the data stored in the system memory in response to detecting the recalculated second MAC matches the first MAC, and transmit the decrypted data to cache.

In some embodiments, a computing device can also store an encrypted first block correction value based on plaintext data to be stored in system memory in response to a write operation to the system memory. Additionally, the computing device can detect a read operation corresponding to the data stored in system memory and calculate a second block correction value based on the data stored in system memory, the second block correction value calculated based on an XOR operation comprising the plaintext of the encrypted data stored in the system memory. In some embodiments, the computing device can determine that the second block correction value does not match a decrypted first block correction value and recalculate the second block correction value subsequent to a correction operation, wherein the correction operation comprises an XOR operation based on decrypted data stored in system memory and a replacement value for a device's data of the system memory. Furthermore, the computing device can decrypt the data stored in system memory in response to detecting the recalculated second block correction value matches the first block correction value, and transmit the decrypted data to cache.

The techniques described herein can prevent reconstruction of data stored in memory to produce a correct ECC code and provide for memory protection against random errors and failures. Additionally, the techniques described herein enable detecting attempts to corrupt memory by injecting data from one tenant to another tenant in a cross-key domain attack or by flipping physical memory bits in a row-hammer attack, or otherwise physically manipulating a memory device. Because the techniques described herein are cryptographically non-deterministic to an adversary, no deterministic manipulation of the memory data by an adversary is possible such as to detection.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

FIG. 1 is a block diagram of an example of a host computing device that can manage encrypted data. The host computing device 100 may be, for example, a mobile phone, laptop computer, desktop computer, or tablet computer, among others. The host computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can transmit encrypted image data.

The processor 102 may also be linked through the system interconnect 106 (e.g., PCI®, PCI-Express®, NuBus, etc.) to a display interface 108 adapted to connect the host computing device 100 to a display device 110. The display device 110 may include a display screen that is a built-in component of the host computing device 100. The display device 110 may also include a computer monitor, television, or projector, among others, that is externally connected to the host computing device 100. The display device 110 can include light emitting diodes (LEDs), and micro-LEDs, among others.

In addition, a network interface controller (also referred to herein as a NIC) 112 may be adapted to connect the host computing device 100 through the system interconnect 106 to a network (not depicted). The network (not depicted) may be a cellular network, a radio network, a wide area network (WAN), a local area network (LAN), or the Internet, among others.

The processor 102 may be connected through a system interconnect 106 to an input/output (I/O) device interface 114 adapted to connect the computing host device 100 to one or more I/O devices 116. The I/O devices 116 may include, for example, a keyboard and a pointing device, wherein the pointing device may include a touchpad or a touchscreen, among others. The I/O devices 116 may be built-in components of the host computing device 100, or may be devices that are externally connected to the host computing device 100.

In some embodiments, the processor 102 may also be linked through the system interconnect 106 to any storage device 118 that can include a hard drive, an optical drive, a USB flash drive, Solid State Drive or other non-volatile memory, an array of drives, or any combinations thereof. In some embodiments, the storage device 118 can include any suitable applications and stored data.

In some embodiments, the processor 102 can include any suitable number of logic modules executable by a memory controller 119. In some examples, the memory controller 119 (or Memory Management Unit) is logic on the processor 102 that interacts with the external system memory device 104. The memory controller 119 can interact with the external memory 104 for read/write operations, to transmit or receive data, to compute/manage the MACs, error correction codes, encryption/decryption, and the like. In some examples, a MAC manager 120 can store a first message authentication code (MAC) based on data stored in system memory in response to a write operation to the system memory. A MAC as referred to herein can include any suitable message authentication code involving a cryptographic hash function and a secret cryptographic key. In some embodiments, the MAC manager 120 can also detect a read operation corresponding to the data stored in the system memory and calculate a second MAC based on the data stored in the system memory. The MAC manager 120 can also determine that the second MAC does not match the first MAC and recalculate the second MAC subsequent to a correction operation, wherein the correction operation comprises an XOR operation based on the data stored in the system memory and a replacement value for a device of the system memory. Furthermore, a decryption manager 122 can decrypt the data stored in the system memory in response to detecting the recalculated second MAC matches the first MAC. In some embodiments, a data transmitter 124 can transmit the decrypted data to cache 126 residing on a processor 102, or any other suitable cache or memory device. In some examples, the cache 126 (or cache hierarchy) is located between the processor 102 and memory controller 119. In some embodiments, the processor 102, cache 126, and memory controller 119 can be on the same physical chip/die or package.

Alternatively, in some embodiments, the MAC manager 120 can store an encrypted first correction value based on data stored in system memory in response to a write operation to the system memory. Additionally, the MAC manager 120 can also detect a read operation corresponding to the data stored in system memory and calculate a second block correction value based on the data stored in system memory, the second block correction value calculated based on an XOR operation comprising plaintext data stored in the system memory. In some embodiments, the MAC manager 120 can determine that the second block correction value does not match a decrypted first block correction value and recalculate the second block correction value with a correction operation, wherein the correction operation comprises an XOR operation based on decrypted data stored in system memory and a replacement value for a device of the system memory. Furthermore, the decryption manager 122 can decrypt the data stored in system memory in response to detecting the recalculated second block correction value matches the first block correction value, and the data transmitter 124 can transmit the decrypted data to cache.

It is to be understood that the block diagram of FIG. 1 is not intended to indicate that the host computing device 100 is to include all of the components shown in FIG. 1. Rather, the host computing device 100 can include fewer or additional components not illustrated in FIG. 1 (e.g., additional memory components, embedded controllers, additional modules, additional network interfaces, etc.). Furthermore, any of the functionalities of the MAC manager 120, decryption manager 122, and data transmitter 124 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the MAC manager 120, decryption manager 122, and data transmitter 124 can be implemented with logic, wherein the logic, as referred to herein, can include any suitable hardware (e.g., a processor, among others), software (e.g., an application, among others), firmware, or any suitable combination of hardware, software, and firmware.

Figure 2:
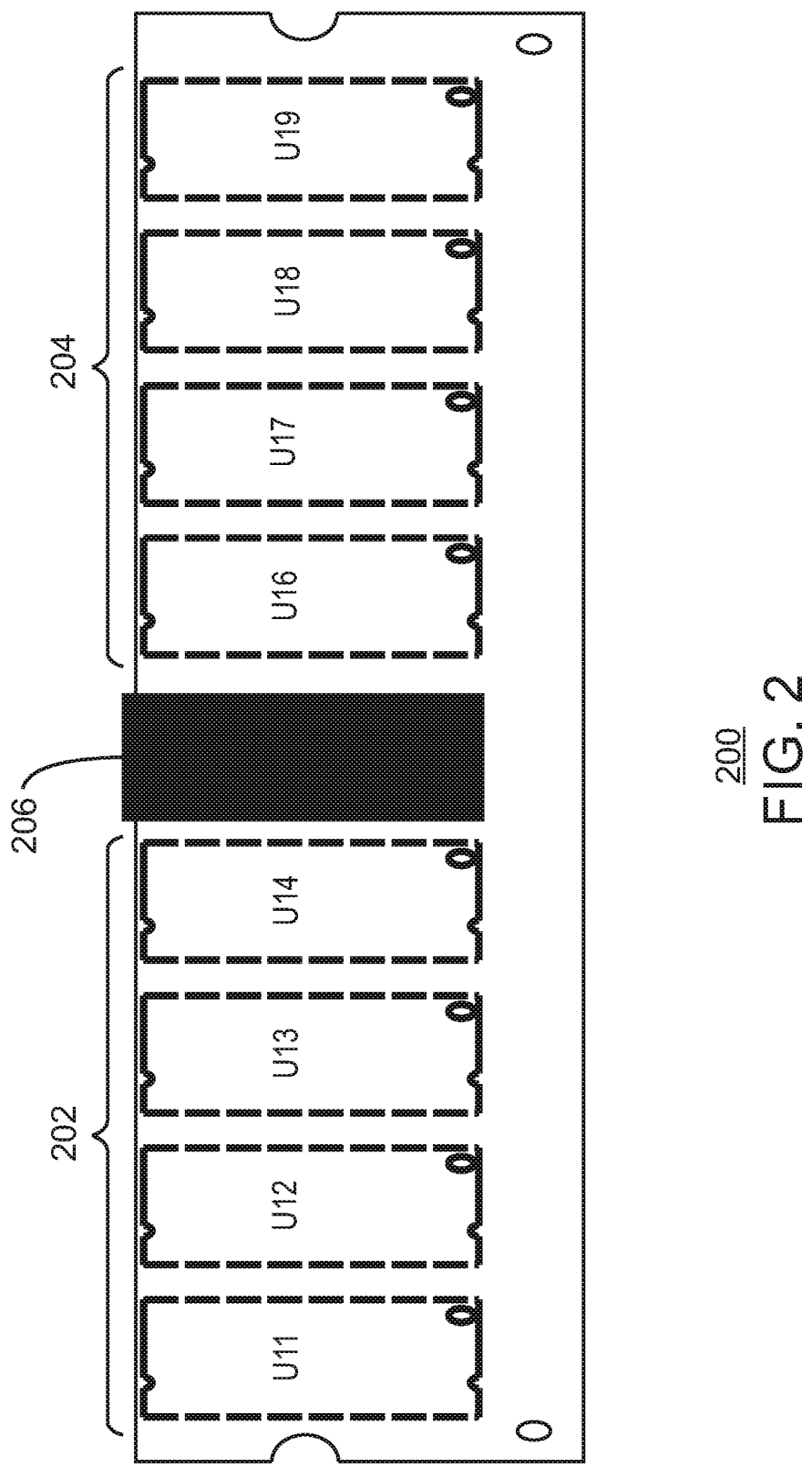
FIG. 2 illustrates a block diagram of a dual in-line memory module.

FIG. 2 illustrates a block diagram of a dual in-line memory module (DIMM). In FIG. 2, the DIMM 200 can be a SIMM, SO-DIMM, NVDIMM, VLPDIMM, DDR DIMM, DDR2 DIMM, DDR3 DIMM, DDR4 DIMM, or DDR5 DIMM, among others. The DIMM 200 can include any number of devices or integrated circuits or chips. For example, eight devices for storing data are depicted in two memory groups 202 and 204 of DIMM 200. In some examples, an error related device 206 can reside proximate memory groups 202 and 204 and the error related device 206 can store a MAC value. In some examples, the DIMM 200 can also include additional devices on a back side (not depicted) of the DIMM 200. The back side of the DIMM 200 can also include memory groups and an error related device to store a device correction value. The error related device 206 and the error related device on the back of the DIMM 200 can provide additional memory to store detection and correction codes.

It is to be understood that the block diagram of FIG. 2 is not intended to indicate that the DIMM 200 is to include all of the components shown in FIG. 2. Rather, the DIMM 200 can include fewer or additional components not illustrated in FIG. 2 (e.g., additional memory components, embedded controllers, additional sensors, additional interfaces, etc.).

Figure 3:
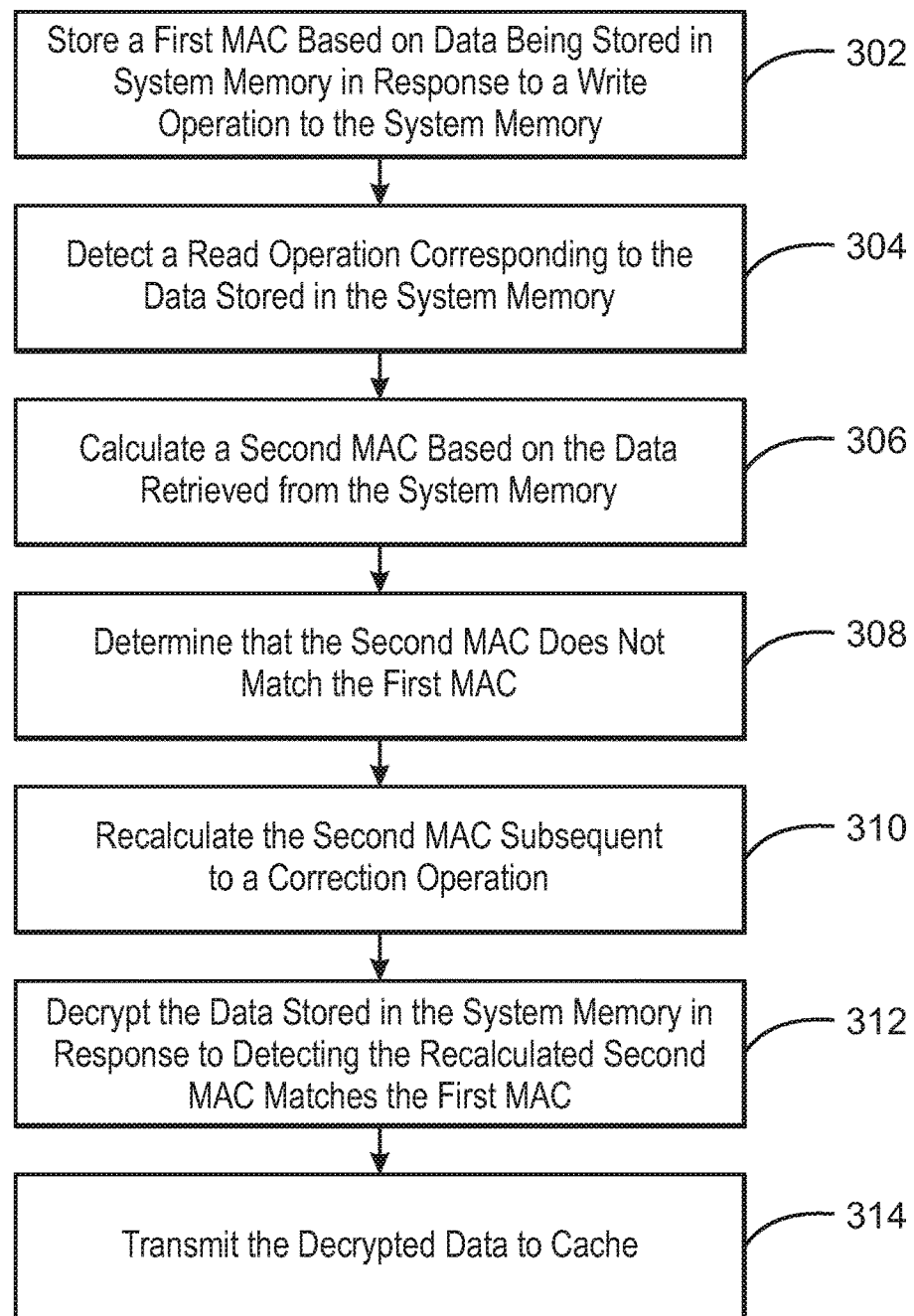
FIG. 3 illustrates a process flow diagram for managing encrypted data.

FIG. 3 illustrates a process flow diagram for managing encrypted data. The method 300 illustrated in FIG. 3 can be implemented with any suitable computing component or device, such as the computing device 100 of FIG. 1.

At block 302, a MAC manager 120 can calculate and store a first MAC based on data being stored in system memory in response to a write operation to the system memory. For example, the MAC manager 120 can detect a write operation to system memory and use any suitable cryptographic MAC function with a second key, among others, to generate a MAC value based on the data stored in memory. In some embodiments, the data stored in memory can include any suitable cipher text that is encrypted with any suitable encryption technique. The result of the logical operation across blocks of device data can be stored as a device data block correction value.

At block 304, the MAC manager 120 can detect a read operation corresponding to the data stored in the system memory. For example, the MAC manager 120 can detect an attempt to execute an instruction based on the encrypted data stored in system memory.

At block 306, the MAC manager 120 can calculate a second MAC based on the encrypted data retrieved from the system memory. The MAC manager 120 can apply the same MAC function used on the write operation, as well as use the same key, in order to produce a matching MAC.

At block 308, the MAC manager 120 can determine that the second MAC does not match the first MAC. For example, the MAC manager 120 can detect if bits of data stored in memory have flipped since the data was stored in memory as part of a write operation. In some examples, the flipped bits in memory can represent data corrupted by a malicious attempt to manipulate the data stored in memory.

At block 310, the MAC manager 120 can recalculate the second MAC with a correction operation, wherein the correction operation comprises an XOR operation based on the device data blocks retrieved from the system memory and a replacement value for an excluded device data block of the system memory. In one example, a replacement value (also referred to herein as an unrolled correction value) can repair corrupted data stored in a device of a memory. For a simplified example, a hypothetical 16 bit cache line may consist of four 4-bit integrated circuits or device data blocks and a 4-bit MAC such as 1010 (block1), 0100 (block2), 1101 (block3), 1011 (block4), and 0010 (MAC). The MAC value can be calculated based on a keyed secure hash operation of device data blocks 1-4. The correction value can be a combination of devices 1-4 based on a logical XOR operation, which results in a value of 1000. The MAC value may also be included in the XOR operation resulting in a 1010 device block correction value (BC). In some examples, the correction value can be used to re-construct any of the missing device data blocks including the MAC device with XOR operations, assuming the other devices are error-free. For example, a substitution data block for an erroneous device 1 can be calculated based on a logical XOR operation of the correction value, the MAC value, and the values of device data blocks 2-4. Additionally, the second MAC value can be calculated based on a keyed secure hash operation combining the replacement correction value for device 1 with the values of device data blocks 2-4 and the stored first MAC value. This second calculated MAC value should match the first stored MAC value if the erroneous device data was repaired by being substituted with the replacement value. The replacement value should then be used instead of the erroneous device data block. Otherwise, the calculated second MAC value will not match the first stored MAC value with a high probability.

At block 312, the decryption manager 122 can decrypt the data stored in the system memory in response to detecting the recalculated second MAC matches the first MAC. At block 314, the data transmitter 124 can transmit the decrypted data to cache.

In some embodiments, the process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the techniques herein can be applied to correct a block or integrated circuit of any suitable size. In some examples, there can be a trade-off between block correction value size and the number of correction attempts used to correct one erroneous data block. As shown below, the cache line can be represented as a set of N device data blocks $B[0], \ldots, B[N-1]$ of size S. In some embodiments, any suitable cryptographically secure hash function can be used as a MAC function, for instance SHA-3-based MAC, among others. In some examples, a MAC function accepts any suitable secret key and a number of data blocks as input as illustrated by Equation 1 below:

$$MAC = SHA3(key, B[0] | \ldots | B[N-1])\quad\text{Eq. 1}$$

In some embodiments, the key may be selected based on meta data or key identifiers that are part of a memory address. In some examples, alternative MAC functions may include the memory address of the data line in memory as part of the hashed data. Additionally, in some examples, the MAC function can be calculated with any suitable alternative cryptographically secure hash function such as SHA-1, or SHA-2, among others.

In some examples, the device block correction value (BC) can be calculated as an XOR operation:

$$BC = MAC \oplus B[0] \oplus \ldots \oplus B[N-1]\quad\text{Eq. 2}$$

In some examples, data returned from a memory read is B'[0] ... B'[N-1], which may be equal to B[0] ... B[N-1] if there was no error. If a MAC mismatches, a repair value (RV) can be calculated with an XOR operation as, where one of the device data blocks B'[i] from the set of B'[0] through B'[N-1] is left out of the equation:

$$RV = BC \oplus MAC \oplus B'[0] \oplus \ldots \oplus B'[N-1]\quad\text{Eq. 3}$$

As discussed above, an attempt to repair each device and verify the MAC in a correction operation can include for each device data:

$$MAC' = SHA3(key, B'[0] | \ldots | (B'[i]\text{ substitute } RV) | \ldots | B'[N-1])\quad\text{Eq. 4}$$

In some examples, the MAC function can be calculated with any suitable alternative cryptographically secure hash function such as SHA-1, or SHA-2, among others. If MAC' matches the MAC, then the repaired value can be returned in place of the erroneous device data block. Otherwise, a return error can be provided.

Alternatively, the repair value RV can be calculated for each device without XORing that device's data block with the other device's data blocks. In this example, the RV can replace a device data block during a repair attempt. In some examples, S=32 and N=16. However, S and N can be any suitable value. In one examples, if S=1, and N=512, each bit can be flipped and the MAC can be verified following each bit flip. In this example, the BC may not be stored.

Figure 4:
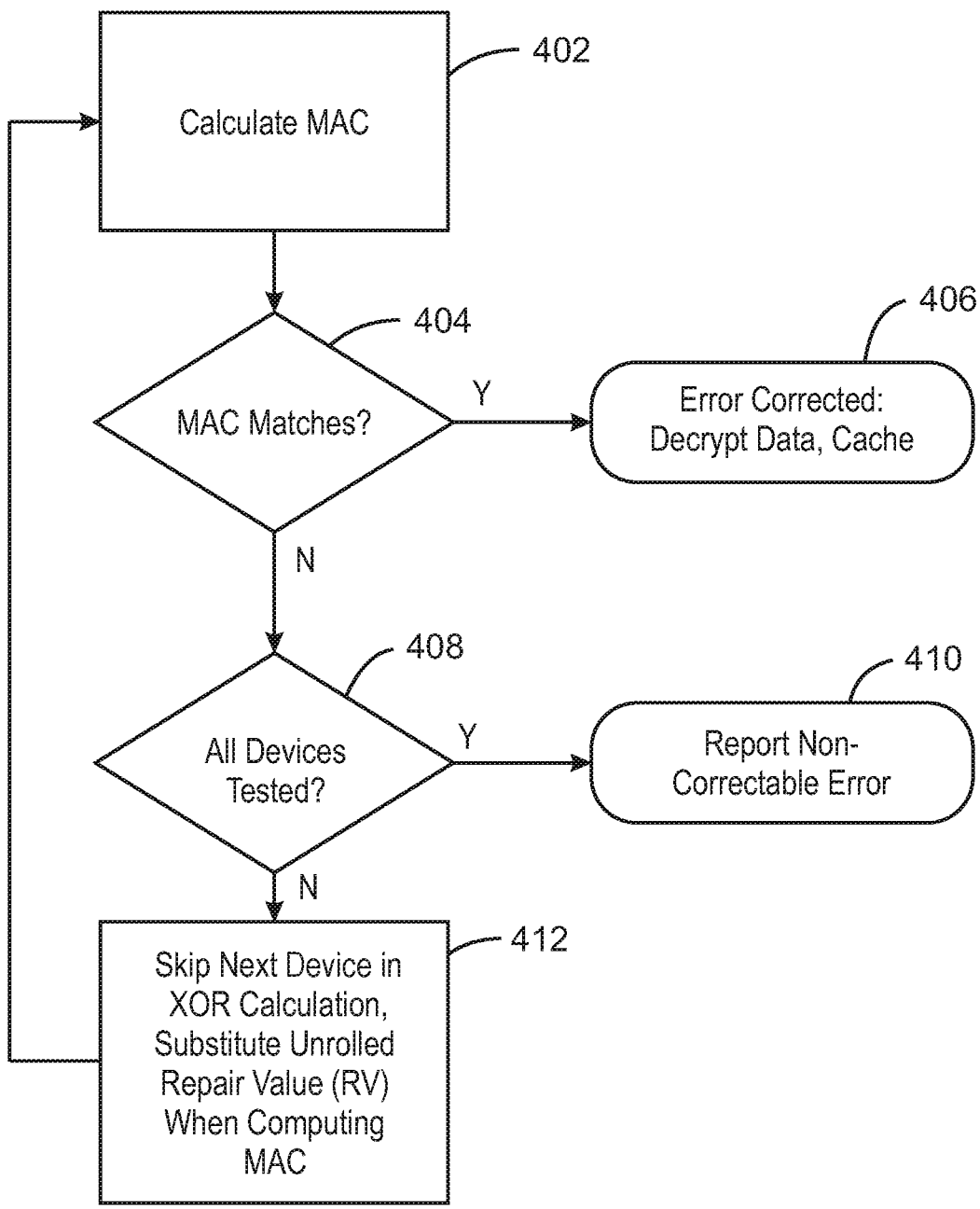
FIG. 4 illustrates a process flow diagram for managing encrypted data.

FIG. 4 illustrates a process flow diagram for managing encrypted data. The method 400 illustrated in FIG. 4 can be implemented with any suitable computing component or device, such as the computing device 100 of FIG. 1.

At block 402, a MAC manager 120 can calculate a MAC. In some examples, the MAC is calculated in response to a read operation as discussed above. The MAC manager 120 can calculate the MAC with a keyed secure hash operation based on encrypted data stored in any suitable number of integrated circuits or devices comprising a cache-line of data.

At block 404, the MAC manager 120 can determine if the calculated MAC matches a stored MAC. If the calculated MAC matches a stored MAC, the process flow continues at block 406, where an error is corrected (or never existed), data is decrypted and sent to a cache device. If the calculated MAC does not match a stored MAC, the process flow continues at block 408, where each of the integrated circuits or memory devices are tested.

If each of the integrated circuits or devices comprising a cache-line of data are tested but the first and second MACs never match, then the process continues to block 410, where a non-correctable error is reported. If each of the integrated circuits or devices in a comprising a cache-line of data have not been tested, the process flow continues at block 412. At block 412, the MAC manager 120 can skip a next integrated circuit or device data block in an XOR calculation, and substitute an unrolled or XORed repair value (RV) to compute a MAC value. The process flow returns to block 402.

In some examples, the techniques herein can be used with a MAC size of any suitable length. For example, two spare integrated circuits or memory devices can be used to store two 32 bit values if the MAC value is 64 bits. The two 32 bit MAC values can be combined with a logical or operation. In some embodiments, two MAC values can be calculated in response to a read operation, and the results of the two MAC values can be concatenated to generate a 64 bit MAC value.

In some embodiments, the techniques herein can use one attempt per integrated circuit or device of a memory DIMM comprising a cache-line of data to correct single bit errors or multibit errors within a single device or integrated circuit. In some examples, the techniques can also correct multiple single bit errors across multiple devices or integrated circuits. For example, if there is a one bit error each in two separate devices, the fully unrolled or XORed correction value can show two bits have flipped. In some embodiments, the MAC can be tested by flipping the various combination of bits in each device data block. For example, for 8 DDR5 devices, two bit positions per device data block across n devices can be flipped. Accordingly, sixty-four MAC tests can identify both devices containing individual single bit errors.

In some examples, if a fully unrolled or XORed correction value has a large number of flipped bits, then the error is likely a full device failure. Device failures can persist across a number of memory reads, but use less attempts to fix. For example, adding only 22*8 extra clocks for SHA3 encryption may be the worst case for DDR5 memory, and these operations can be performed in parallel. In some examples, SHA3 encryption takes fewer clock cycles than AES-XTS decryption, so integrity does not add any performance overhead for memory reads beyond encryption when the MAC is calculated over the cipher text and computed in parallel with decryption on a memory read operation.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5A:
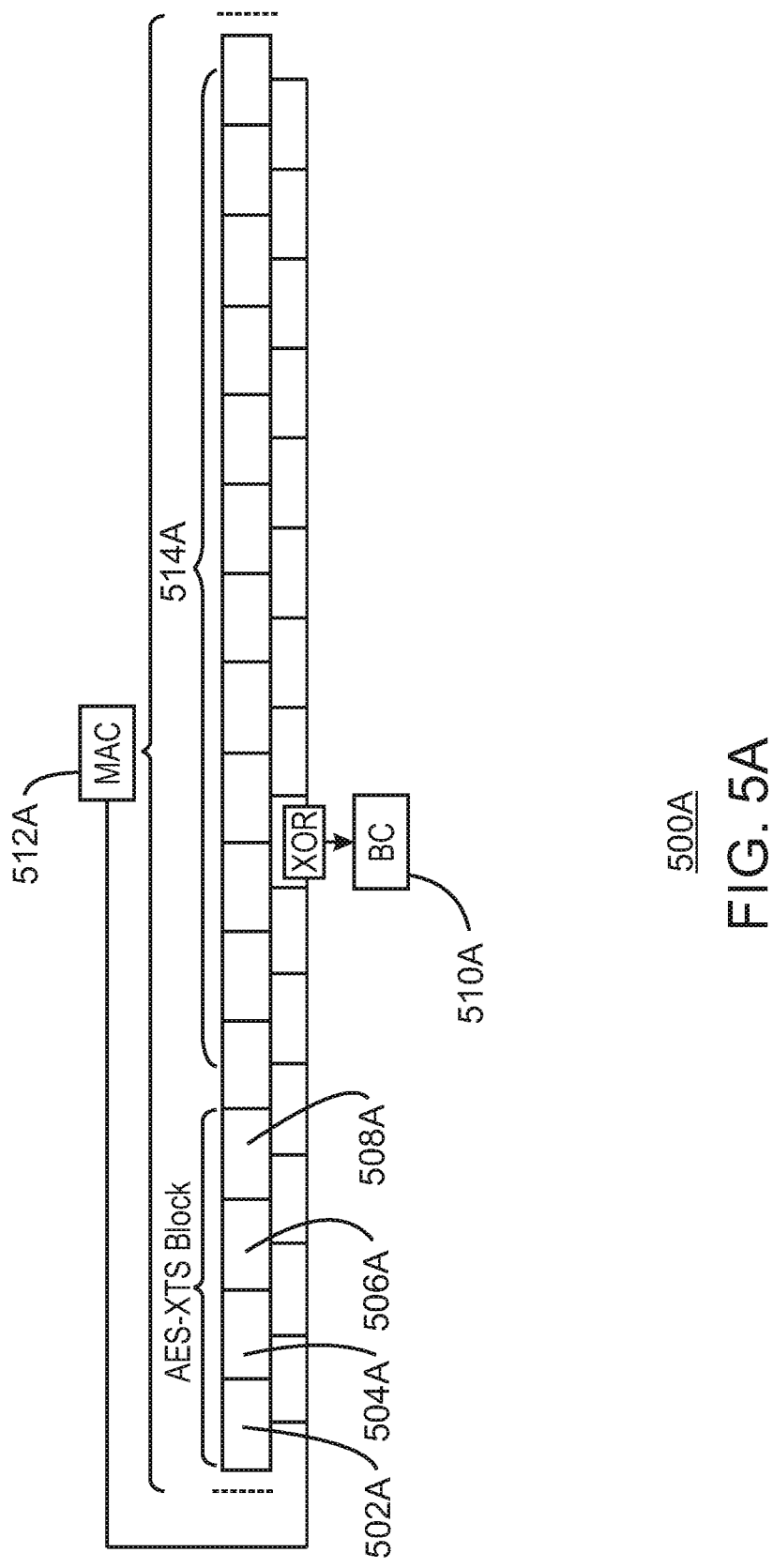
FIGS. 5A and 5B illustrate examples of data structures for storing encrypted data.
Figure 5B:
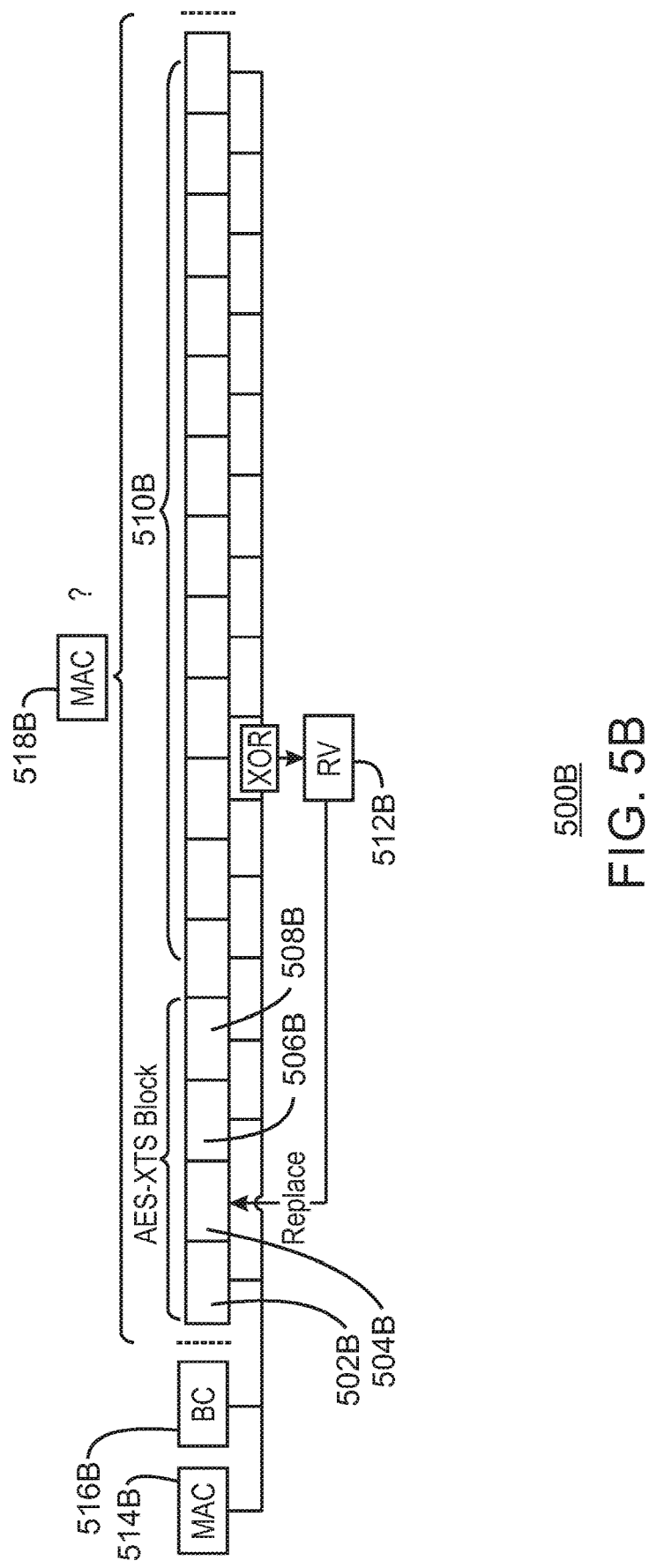

FIGS. 5A and 5B depict examples of data structures for storing encrypted data. In some examples, each device 502A can include any suitable number of bits. For example, each device 502A can include a 16 bit value, 32 bit value, or 64 bit value, among others. In some embodiments, any number of devices can be equal to an encryption key or encryption block in size. For example, devices 502A, 504A, 506A, and 508A, if 32 bits in size, may be equal to a block size of data encrypted with AES. In some embodiments, a correction value 510A is generated by calculating a result of an XOR operation based on a previously stored MAC value 512A and encrypted data values stored in device data blocks 502A, 504A, 506A, 508A, and, likewise, all the rest of the devices shown in 514A contributing to the cache-line of data.

In FIG. 5B, device data blocks 502B, 504B, 506B, 508B, and 510B can store encrypted data in memory. In some examples, a replacement value 512B is generated for device data block 504B based on an XOR operation of device data blocks 502B, 506B, 508B and all the other device data blocks shown as 510B, MAC 514B, and correction value 516B. For example, if the stored MAC 514B fails to match the calculated MAC 518B of the data line (the combined device data blocks), the replacement value 512B can be generated with an XOR operation (also referred to herein as unrolling) based on the MAC value 514B, correction value 516B, and each of the device data blocks excluding the one device data block being tested. For example, device data block 504B can be excluded from the XOR sequence to determine if the device data block 504B includes erroneous bits as the resulting replacement value is used in place of device data block 504B and the recalculated second MAC matches the stored first MAC.

Figure 6:
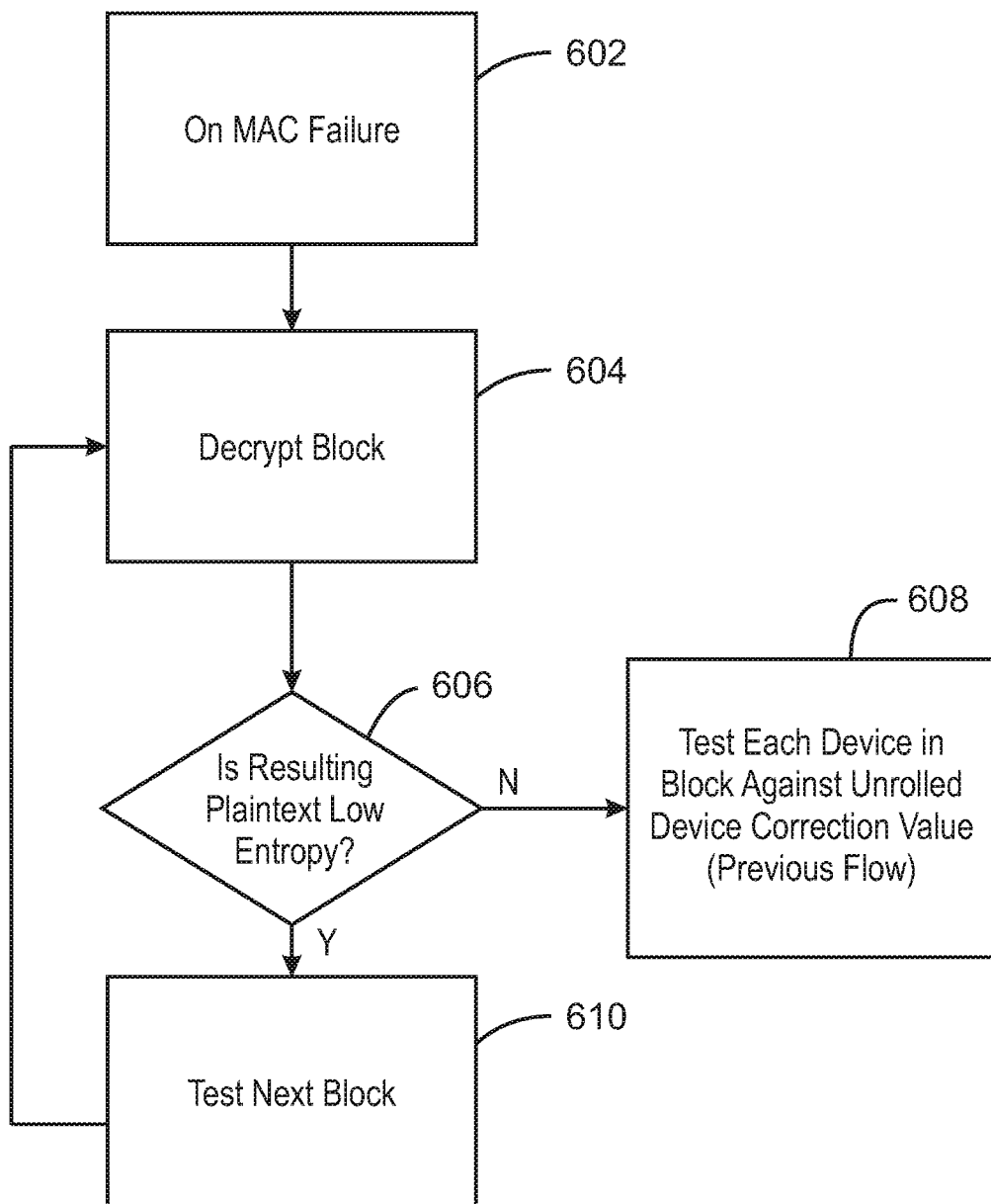
FIG. 6 is a process flow diagram for managing encrypted data based on a level of entropy of the data.

FIG. 6 illustrates a process flow diagram for managing encrypted data based on an entropy level of the data. The method 600 illustrated in FIG. 6 can be implemented with any suitable computing component or device, such as the computing device 102 of FIG. 1. The method 600 can utilize heuristics to localize which device or portion of a memory device likely failed. For example, if a decrypted AES block shows random plaintext, likely one of the device data blocks contributing to that AES block failed.

At block 602, the MAC manager 120 can detect that a calculated MAC does not match a stored MAC value. At block 604, the MAC manager 120 can decrypt a number of blocks of data in stored memory. In some embodiments, the number of decrypted device data blocks is equal to a length of an encryption key. For example, four device data blocks each storing thirty-two bits may be decrypted for a one-hundred and twenty-eight bit encryption block. In some examples, a size of the block corresponds to a size of a block cipher's input or output. For example, a block cipher such as AES128 can use a 128 bit key to encrypt/decrypt a 128 bit block size of data. Alternatively, a block cipher such as AES256 can use a 256 bit key to encrypt/decrypt the same size data block of 128 bits.

At block 606, the MAC manager 120 can determine if the plaintext of the decrypted data block has an entropy that is below a threshold value. For example, if the number of zero bits and one bits in the plaintext is approximately equal or has an equal distribution, the entropy is above a threshold due to the random nature of the data. Accordingly, the method 600 can include ignoring plaintext data with low entropy, or choosing the blocks with the highest entropy for replacement tests first. In one example, a decrypted block with multiple 8 bits of zeros in byte aligned positions may not be considered random or corrupted, so those devices comprising the block can be eliminated from the process of identifying a corrupted data block with errors. In other examples, decrypted plaintexts with repeating values or values similar to other decrypted blocks are considered to have lower entropy, and may be at first skipped in the replacement value tests as they are unlikely to be the source of the memory corruption.

If the plaintext of the decrypted data has an entropy that is above a threshold value, the process flow continues at block 608. At block 608, the MAC manager 120 can determine if each block of data is corrected by replacing the device data block with a correction value as discussed above in relation to FIG. 3. If the plaintext of the decrypted data has an entropy below a threshold value, the process flow continues at block 610 by testing a subsequent number of blocks of data before returning to block 602 of the process flow diagram. The MAC manager may also recalculate the second MAC after each device data block is substituted with a replacement value for the decrypted block of the highest entropy.

In some embodiments, compression can also be used on data to fit Reed-Solomon codes or similar ECC error detection codes within the data cache lines. If these codes are duplicated across multiple blocks, then they can also be used to precisely identify the bit error locations without requiring trial and error. Similarly, compression of the data line can allow the MAC value to be stored in the space freed by compression, reducing the need for additional memory to hold the MAC values. Furthermore, if there is a device failure, or stuck at fault, it is likely across multiple memory reads to aligned memory locations corresponding to the same device. This means that multiple adjacent reads will experience the same fault location. This will help the error correction focus on the most likely device for stuck failure, again, reducing the trial and error.

The process flow diagram of FIG. 6 is not intended to indicate that the operations of the method 600 are to be executed in any particular order, or that all of the operations of the method 600 are to be included in every case. Additionally, the method 500 can include any suitable number of additional operations.

Figure 7:
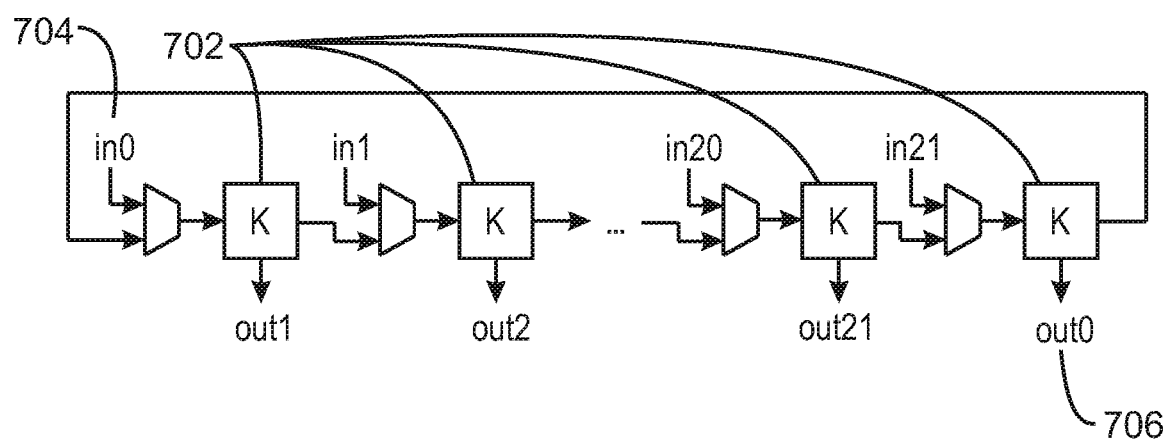
FIG. 7 is an example pipeline for managing encrypted data.

FIG. 7 depicts a pipeline technique for calculating a MAC. In some embodiments, a pipeline for MAC calculations can be used for speculatively repaired device data blocks instead of sequential MAC calculation for each repair attempt. For example, in a fully pipelined design (1 stage/clock cycle), at each clock cycle i=0 . . . 15, the cache line can be submitted with "repaired" device i into the MAC generation pipeline, such that the MAC values are computed in parallel. In one example, assuming an SHA-3 encryption pipeline with 22 cycles latency, total latency results can be a best case of 22 cycles, a worst case of 47 cycles, and an average case of 29 cycles. In some examples, an SHA-3 pipeline may be partially pipelined to match the throughput, i.e., accepting one cache line every four cycles. In some embodiments, repair of the device storing a MAC value does not require recalculation of the MAC value over cache line data since the data is unchanged in a repair attempt. Rather, the process can include performing XOR operations to generate a "repaired" MAC and try to match the repaired MAC with the MAC generated over the raw read data. In some examples, this repair attempt can be executed first before trying to repair any device data block, which can have at least 22 cycles latency due to MAC re-calculation.

In the example 700 of FIG. 7, a fully pipelined SHA-3 engine consists of 22 identical concatenated stages, each of which has a set of state registers and combinational logic for a Keccak function. The input can be supplied to each stage and the last stage provides the output. To increase the utilization of this pipeline, a loop of the pipeline stages K 702 can feed the input 702 to any of the pipeline stages through the inputs in0 . . . in21 704. The output for a particular input data is retrieved after 22 cycles from the corresponding output out0 . . . out21 706.

This looped design allows for loading multiple input cache lines in the same cycle and processing them in parallel instead of skewed by one cycle. This is useful when calculating MACs to repair a device data block. In best case, if the pipeline is empty, the "repaired" cache lines can be loaded in parallel to determine which device was faulty, therefore reducing the latency. In some examples, unused inputs can be used to calculate MACs for other data responses arriving from memory. This improves the latency and the throughput for memory-intense workloads with frequent DRAM errors. A hardware arbiter can be used to keep track of the MAC computations that are in-flight and to multiplex input data into the appropriate stages. This approach can also be applied to a partially pipelined design, in which each stage applies multiple rounds of Keccak function to the current state until transferring it to the next stage. Each of these stages can have an external input and output as described above, in order to maximize utilization of each stage.

Figure 8:
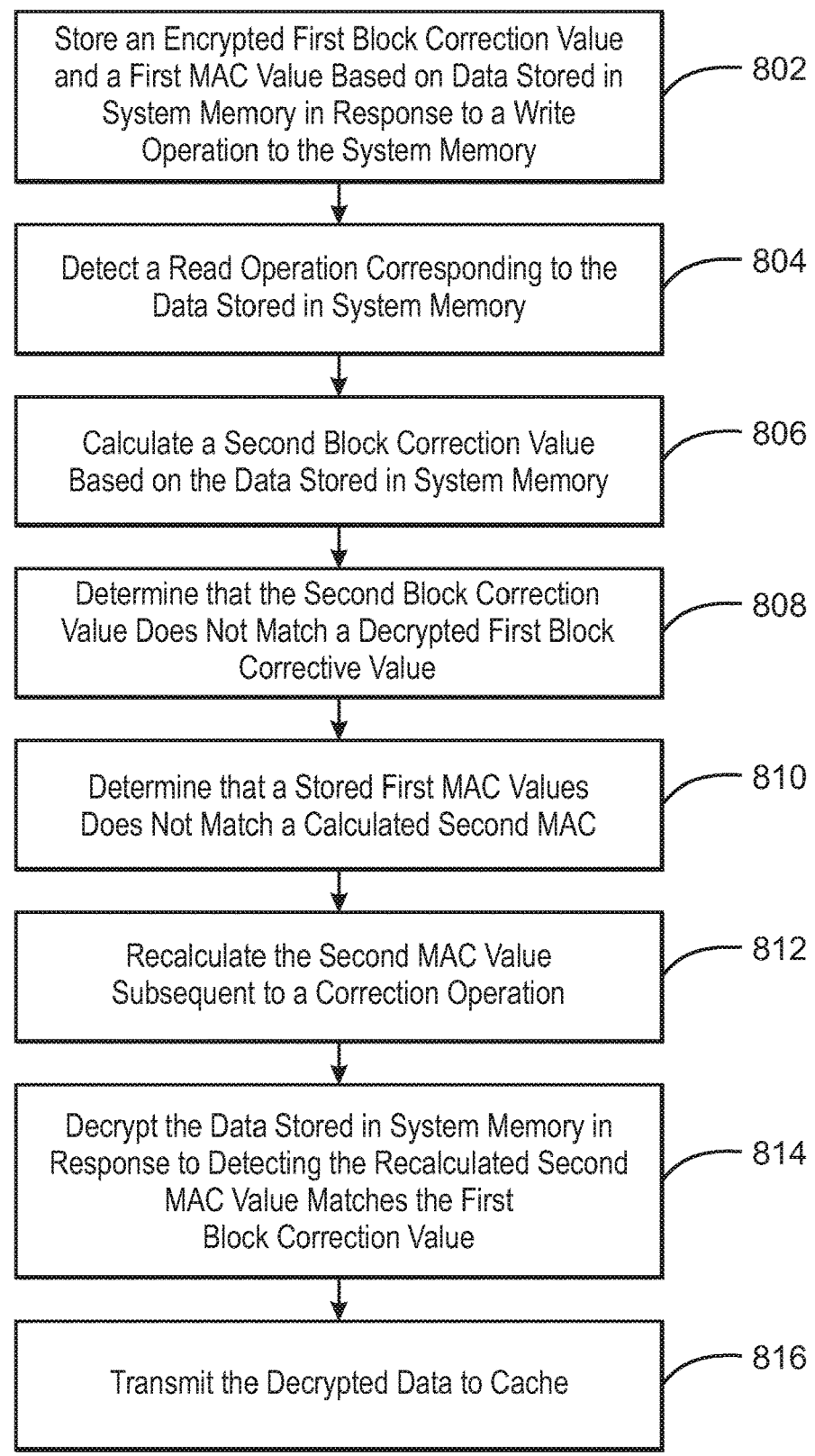
FIG. 8 is a process flow diagram for managing encrypted data.

FIG. 8 illustrates a process flow diagram for managing encrypted data. The method 800 illustrated in FIG. 8 can be implemented with any suitable computing component or device, such as the computing device 102 of FIG. 1.

At block 802, the MAC manager 120 can store an encrypted first block correction value and a first MAC value based on data stored in system memory in response to a write operation to the system memory. The first block correction value comprises the XOR of the plaintext of each block of data in a data line written to memory. Additionally, the MAC manager may calculate an additional MAC value for the encrypted data in the data line and store the additional MAC value to memory. At block 804, the MAC manager 120 can detect a read operation corresponding to the data stored in system memory.

At block 806, the MAC manager 120 can calculate a second block correction value based on the data stored in system memory. In some examples, the second block correction value can be calculated based on an XOR operation comprising plaintext data or decrypted data of each block of a data line stored in the system memory. In some examples, the second block correction value can be generated in response to a read operation.

At block 808, the MAC manager 120 can determine that the second block correction value does not match a decrypted first stored block correction value. In this case, the MAC manager 120 may fetch the additional stored MAC value from memory and calculate a second MAC of the data line stored in memory. If the stored MAC matches the second calculated MAC, then the block correction code is determined to be in error and the data may be decrypted and sent to cache. If the stored MAC does not match the second calculated MAC at block 810, the MAC manager 120 can recalculate, at block 812, the second block correction value with a correction operation. In some embodiments, the correction operation comprises an XOR operation based on the decrypted data blocks stored in system memory, and a replacement value for a device data block or integrated circuit of the system memory is determined by leaving out the device data block and using the remaining block correction value in place of the decrypted device data block plaintext. The replacement value is then encrypted with a secret key (used to encrypt the device data blocks) and the second MAC is recalculated using the remaining encrypted blocks and the encrypted replacement value.

At block 814, the decryption manager 122 can decrypt the data stored in system memory comprising a cache-line in response to detecting the recalculated second MAC value matches the first stored MAC value. At block 816, the data transmitter 124 can transmit the decrypted data to cache.

The process flow diagram of FIG. 8 is not intended to indicate that the operations of the method 800 are to be executed in any particular order, or that all of the operations of the method 800 are to be included in every case. Additionally, the method 800 can include any suitable number of additional operations. In the method 800, the block correction code itself can securely (in an unforgeable way) detect the data has at least one error. The additional MAC value can be used to determine when any errors are corrected or fixed. If there is no error, the additional stored MAC value is not retrieved. In some embodiments, the additional MAC value may be stored in a separate memory location, thus, removing the need for additional devices on a memory device, such as a DIMM, for the MAC. Some embodiments may eliminate the additional stored MAC value entirely by using the entropy of each decrypted block of data to determine which device/block is in error and using the replacement value in place of the highest entropy decrypted block of data as illustrated in FIG. 6. Likewise, data compression techniques can be used to fit a MAC within space freed by compression of the data line.

Figure 9:
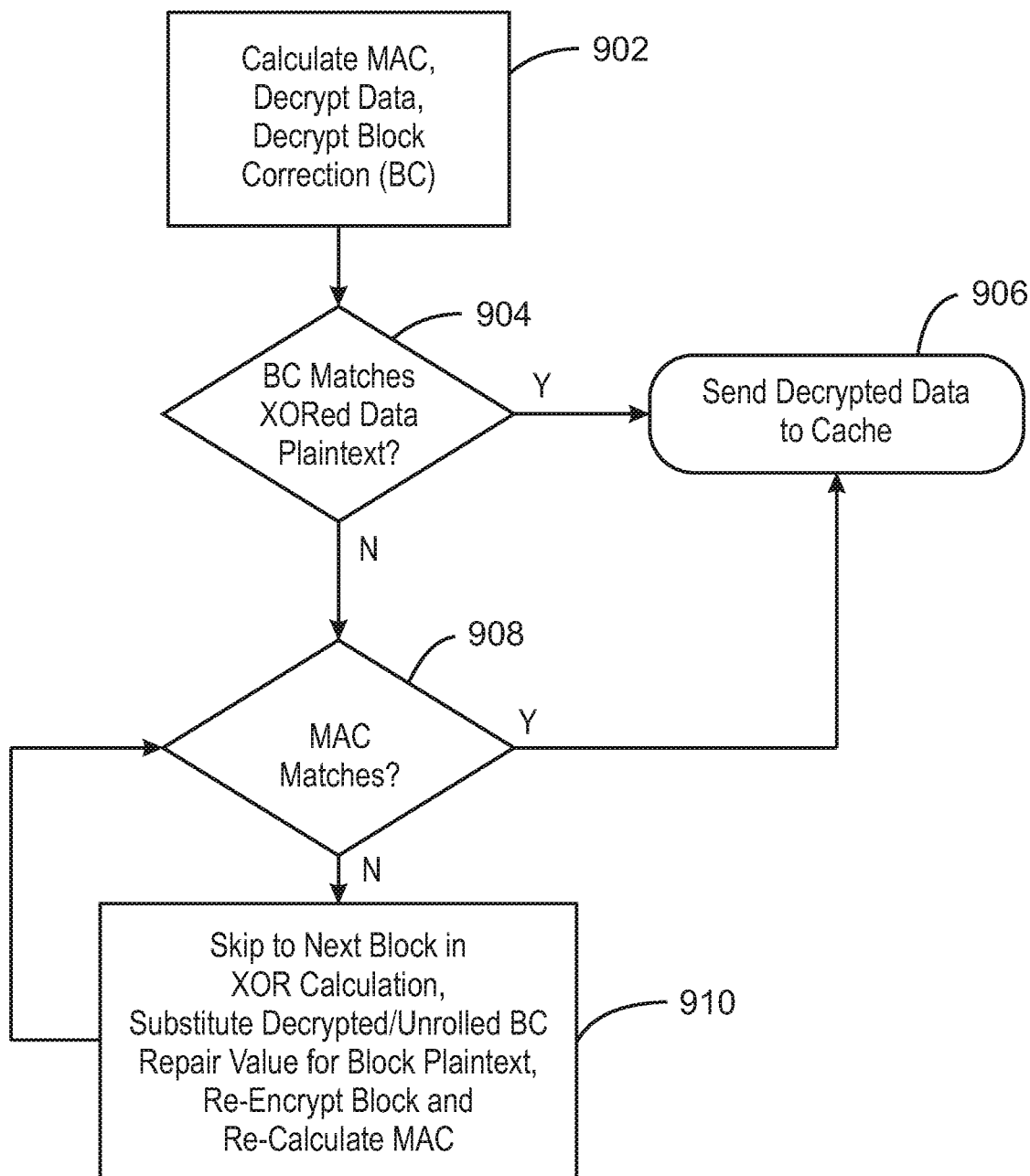
FIG. 9 is a process flow diagram for managing encrypted data based on a correction value as a second MAC value.

FIG. 9 is a process flow diagram for managing encrypted data. In some embodiments, the method 900 can include transforming each device data block before calculating the error correction code. One transform is to use a small block size cipher (e.g. SIMON, SPECK, PRINCE, among others), where the block size matches the device size, to encrypt each device individually with a secret key before XORing each resulting cipher text. Some embodiments may include a tweak, for example using XTS (XEX-based tweaked-codebook mode with ciphertext stealing) or other tweakable mode, where the tweak is comprising the address of the device data block to create a memory position/location dependent ciphertext. Which key is used to encrypt/decrypt the data line may also be selected by additional address bits or other cacheable meta-data indicating which key to use from a set of keys.

Accordingly, even the correction code is secure. For example, an encryption of each device with a small block size cipher can be used as input to the XOR function to compute the XORed Correction code. An attacker would need to know this secret function output to get all the device data blocks to unroll to zero. Therefore, both the MAC and the correction codes work together, improving security of the block.

At block 902, the MAC manager 120 can calculate a MAC, decrypt data, and decrypt a block correction value in response to a read operation. In some examples, the block correction value is stored in an encrypted format from a previous write operation. In some embodiments, the MAC can be calculated based on the encrypted data stored in memory prior to decryption.

At block 904, the MAC manager 120 can determine if the decrypted block correction value matches an XOR result based on the plaintext data or decrypted data. If the block correction value matches the XORed plaintext data blocks, the process flow continues at block 906 and the decrypted data is sent to cache. If the block correction value does not match the XORed plaintext data blocks, the process flow continues at block 908.

At block 908, the MAC manager 120 can determine if the calculated MAC matches a stored MAC. If the calculated MAC matches a stored MAC, the process flow continues at block 906 by sending decrypted data to a cache device. If the calculated MAC does not match a stored MAC, the process flow continues to block 910. At block 910, the MAC manager 120 can skip to a next device data block in an XOR calculation, substitute the decrypted block correction value for a decrypted device data block, re-encrypt the replacement value, and re-calculate a MAC over the remaining encrypted device data blocks and the encrypted replacement value before returning to block 908. Therefore, in order for a corrupted cache line to pass the integrity check, an attacker must not only forge the MAC, but also forge the block correction value, which is generated using a secret key. Therefore, this effectively becomes a two MAC solution, particularly when a stronger (larger) MAC is needed than can fit in the error detection code's device data block. As DRAM device densities increase, the above scheme is also effective at reducing ECC memory costs as the MAC may be stored separately in sequestered (e.g. allocated by software) memory or as a table structure in memory (table indexed by the memory address associated with each table entry). The extra ECC chip/device on the DIMM for the ECC error detection code and/or MAC may therefore be eliminated. Meanwhile, the sequestered memory for the MAC may be used when the device correction fails to match. The MAC is used to determine which of the correction values succeeded or if the correction device was the failing part as the MAC will match the uncorrected data line value. Finally, techniques like compression may be used to embed the MAC within the data line (when compressible), using a MAC lookup only for data cache lines that do not compress. This can further reduce the amount of sequestered memory required and reduce the number of memory lookups when correcting memory errors.

Figure 10A:
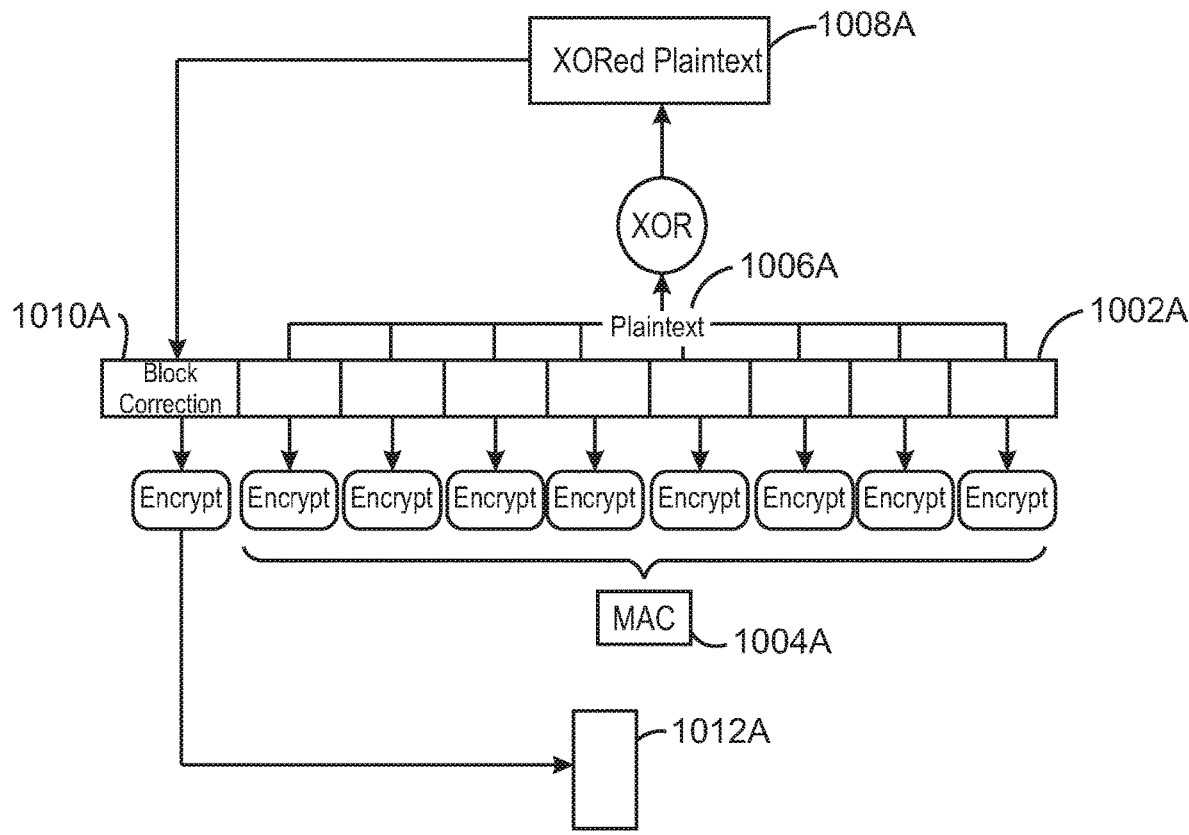
FIGS. 10A and 10B are examples of techniques for managing encrypted data with a block correction value as a second MAC.
Figure 10B:
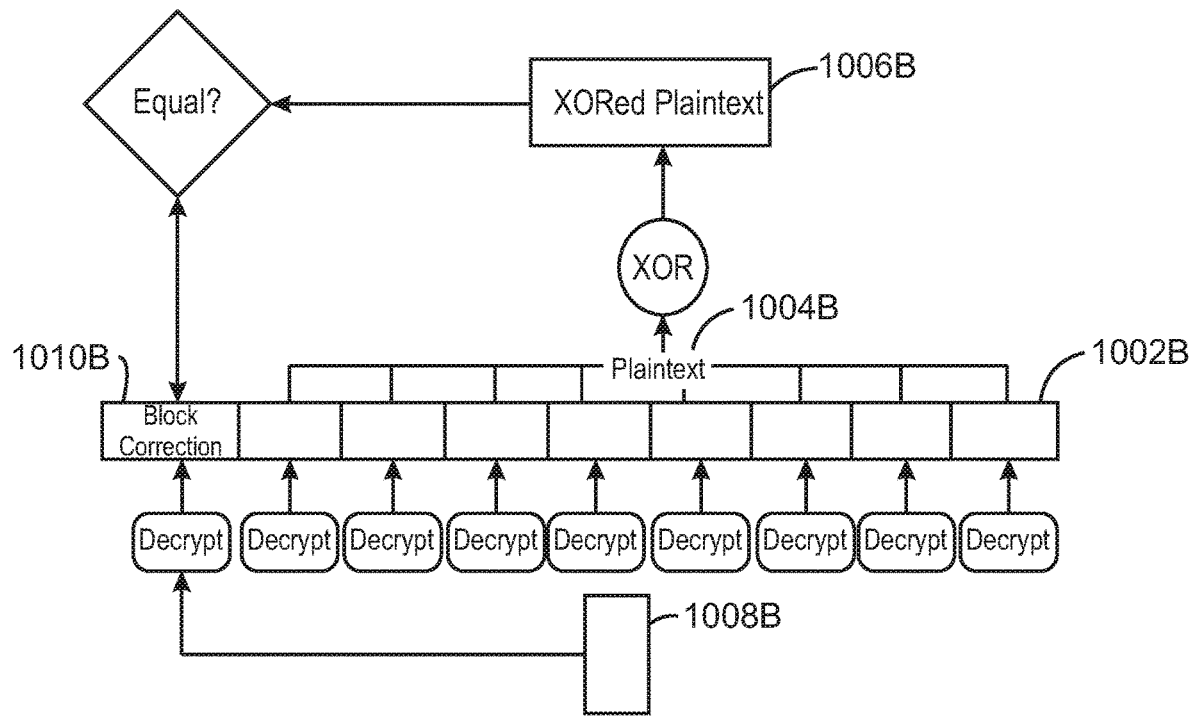

FIGS. 10A and 10B depict techniques for managing encrypted data with a block correction value and a second MAC. In FIG. 10A, on a memory write, the encrypted data 1002A can be used to calculate a MAC 1004A that is stored separately. Additionally, a decrypted version of the data or plaintext data 1006A can be combined with an XOR operation to generate XORed plaintext 1008A that is a correction value 1010A. The correction value 1010A can be stored in an encrypted format 1012A as an encrypted block correction value.

In FIG. 10B, on a memory read, all the device data blocks for a memory line are decrypted. Each device block's plaintext is then XORed together and compared with the decrypted block correction value 1010B. Each device of data 1002B can be decrypted before XORing the plaintext 1004B to generate XORed plaintext 1006B. In some examples, the encrypted block correction value 1008B can be decrypted to generate a decrypted block correction value 1010B that is compared to the XORed plaintext 1006B. In some examples, when the decrypted value of 1010B and 1006B do not match, the XORed plaintext 1006B can be XORed with the decrypted block correction value 1010B while leaving out one device/block at a time from the 1006B calculation. The resulting block correction value is then encrypted to produce the original encrypted erroneous device's data block value. This value is then substituted for the left out device's data block and the MAC is recalculated and compared with the separately stored MAC until the erroneous device's data block is identified and corrected. In some examples, even when the MAC passes, the block correction value should unroll or generate a zero value as a result of an XOR operation when the blocks/devices are transformed and XORed with the original block correction value.

In some embodiments, techniques described herein can also provide replay protection even when multiple keys (MKTME) were used to AES-XTS encrypt the data. For example, the MAC manager 120 can periodically rekey the MAC values with a unique key where the MAC is recomputed using the MKTME AES-XTS cipher text and a unique MAC key. The rekeying can coincide with memory refresh in which the memory is read, the MAC is computed with an old key, compared with the old stored MAC for the same memory line, and if these values match, the MAC is recomputed with the new key before writing the new MAC back to the memory. In some examples, techniques can use a construct such as ICV, which is equal to HMACrk(Ck) XOR AESk(Address). This construct allows a refreshing key rk for the HMAC. This independently combines the MAC over the data cipher text (Ck) from a particular domain key (k) and a key dependent test using the tweak (XTS tweak using the address).

In this example, if an adversary or unauthorized user replays content from another key domain for the same memory address, the HMAC over the cipher text will compute correctly but the address based tweak using the current key domain key k will not match on a memory read. The MAC manager 120 may compute the old HMAC (using the previous refresh key rk) over the cipher text data cache line, XOR the data cache line contents from the stored ICV and XOR it with the new HMAC using the refreshed key.

In some embodiments, the MAC manager 120 can use an alternative construct to rekey a MAC. For example, the MAC manager 120 can use the construct ICV, which is equal to HMACrk(Ck) XOR HMACk(Address). This construct provides cipher text corruption detection, is scalable cross key domain corruption detection, and can refresh for restricting replay without additional MAC keys.

In another embodiment, the MAC manager 120 can use the construct ICV, which is equal to ENCRYPTrk (SHA3 (Ck,TWEAKk)) to rekey MAC values. Here ENCRYPT can be a small block cipher (e.g. SIMON, among others) that is the same size as the truncated SHA3 HMAC (e.g. 32 bits or 64 bits, etc.) encrypting the HMAC with the refreshing key rk. The HMAC also contains an XTS based tweak (e.g. AES encrypted memory Address based on the data encryption key) in addition to the cipher text based on the data encryption key k. This allows the ICV to prevent both cross-domain attacks and be bound to the memory address/location where the data is physically stored. The tweak operation can be the same as used to XTS encrypt the data to produce Ck, but a different tweak offset can be used exclusively for this operation (e.g. based on an extended address value to produce an additional unique tweak value from the tweaks used to encrypt the data line). Similarly, other cryptographic key derivation techniques can be used instead of the tweak to produce a data encryption key dependent HMAC. In some examples, the TWEAKk based on the data encryption key k is effectively a key derivation function that makes the SHA3 hash algorithm output a MAC which may then be truncated. The advantage of using the tweak with the encryption key is that it eliminates the need to store separate keys for calculating the MAC. Rather, the encryption key can be reused through a key derivation function that is encrypting the memory address (with padding) for the encrypted data line (Ck) using the encryption key k. Likewise, any secure hash function may be used in place of SHA3 and any key derivation function may be used in place of the TWEAK.

A replay/version tree can also be used with this construct. Here the embedded MACs are the ECC memory MACs as described previously. The MAC of the replay tree can include a parent counter value for the cache line. A root counter/nonce (or counters/nonces for multiple memory regions) can also be embedded in the hardware, on-die. The first level in the tree in memory contains a cache line with a set of counter/nonce values and the MAC in ECC memory. This MAC is calculated over all the counter values comprising the cache line and the associated root counter/nonce stored on-die. Each counter/nonce value on the line is a parent for the next level of the tree. The next level of the tree is a line with counter/nonce values, again where the MAC in ECC memory hashes all the counter/nonce values in the line and a single parent nonce/counter from the previous line in the tree. The last level/leaf of the tree consists of the data line and its MAC in ECC memory as described previously, the one difference being that the MAC is also hashed over the parent counter/nonce value. In this way, replay can be prevented as every time data is written to memory, the root counter and all counter values in the branch of the counter/nonce tree leading to the updated data line are incremented/updated and all the affected MACs in ECC memory recalculated. On a memory read, the MACs are verified for the branch of the tree related to the read data line by checking that the counter/nonce values are correct/unmodified. The MAC values can be calculated with a different secret key than the key used to encrypt the data lines, and the MAC computed over the AES-XTS cipher text of the data line, thereby allowing different data to be encrypted with different keys such as MKTME.

In some embodiments, the ECC/Integrity values can also be stored to separate memory locations so they don't require the addition of physical ECC memory/ECC DIMMs. Additional memory reads/writes will be used to fetch the ECC/integrity values from the separate memory locations in this case. For example, the ECC correction field can be extended to both correct memory and be an HMAC for detecting errors. Using entropy tests to validate which device is likely in error eliminates the need to store any other values, saving half of the ECC memory overhead and reducing costs.

Figure 11:
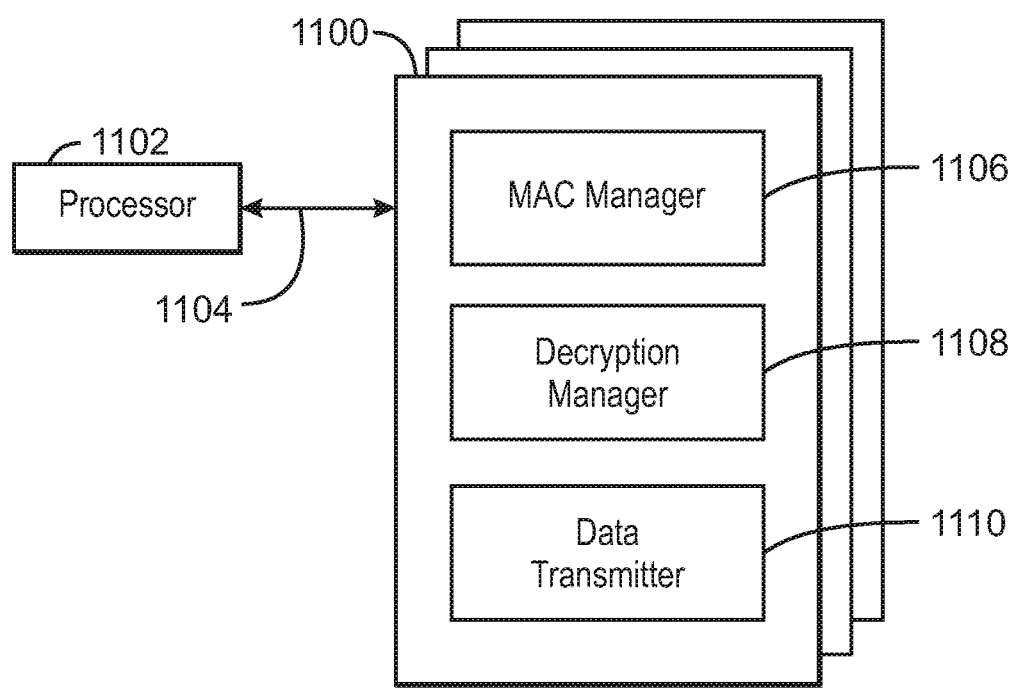
FIG. 11 is an example of a tangible, non-transitory computer-readable medium for managing encrypted data.

FIG. 11 illustrates a block diagram of a non-transitory computer readable media for managing encrypted data. The tangible, non-transitory, computer-readable medium 1100 may be accessed by a processor 1102 over a computer interconnect 1104. Furthermore, the tangible, non-transitory, computer-readable medium 1100 may include code to direct the processor 1102 to perform the operations of the current method.

The various software components discussed herein may be stored on the tangible, non-transitory, computer-readable medium 1100, as indicated in FIG. 11. For example, a MAC manager 1106 can store a first message authentication code (MAC) based on data stored in system memory in response to a write operation to the system memory. In some embodiments, the MAC manager 1106 can also detect a read operation corresponding to the data stored in the system memory and calculate a second MAC based on the data stored in the system memory. The MAC manager 1106 can also determine that the second MAC does not match the first MAC and recalculate the second MAC with a correction operation, wherein the correction operation comprises an XOR operation based on the data stored in the system memory and a replacement value for a device of the system memory. Furthermore, a decryption manager 1108 can decrypt the data stored in the system memory in response to detecting the recalculated second MAC matches the first MAC. In some embodiments, a data transmitter 1110 can transmit the decrypted data to cache residing on a processor 102, or any other suitable cache or memory device.

Alternatively, in some embodiments, the MAC manager 1106 can store an encrypted first block correction value based on data stored in system memory in response to a write operation to the system memory. Additionally, the MAC manager 1106 can also detect a read operation corresponding to the data stored in system memory and calculate a second block correction value based on the data stored in system memory, the second block correction value calculated based on an XOR operation comprising plaintext data stored in the system memory. In some embodiments, the MAC manager 1106 can determine that the second block correction value does not match a decrypted first block correction value and recalculate the second block correction value with a correction operation, wherein the correction operation comprises an XOR operation based on encrypted data stored in system memory and a replacement value for a device of the system memory. Furthermore, the decryption manager 1108 can decrypt the data stored in system memory in response to detecting the recalculated second block correction value matches the first block correction value, and the data transmitter 1110 can transmit the decrypted data to cache.

It is to be understood that any suitable number of the software components shown in FIG. 11 may be included within the tangible, non-transitory computer-readable medium 1100. Furthermore, any number of additional software components not shown in FIG. 11 may be included within the tangible, non-transitory, computer-readable medium 1100, depending on the specific application.

Example 1

In some examples, a system for managing encrypted memory comprises a processor to store a first message authentication code (MAC) based on data stored in system memory in response to a write operation to the system memory. The processor can also detect a read operation corresponding to the data stored in the system memory, calculate a second MAC based on the data retrieved from the system memory, and determine that the second MAC does not match the first MAC. Furthermore, the processor can also recalculate the second MAC subsequent to a correction operation, wherein the correction operation comprises an XOR operation based on the data retrieved from the system memory and a replacement value for a device of the system memory. Additionally, the processor can decrypt the data stored in the system memory in response to detecting the recalculated second MAC matches the first MAC, and transmit the decrypted data to cache.

Alternatively, or in addition, the correction operation comprises recalculating the second MAC for a plurality of devices of the system memory. Alternatively, or in addition, the processor is to execute the XOR operation for each of the plurality of devices, wherein the XOR operation is based on the replacement value and the data stored in each of the plurality of devices with one device excluded. Alternatively, or in addition, the processor is to generate a non-correctable error in response to detecting the recalculated second MAC does not match the first MAC for each device of the system memory. Alternatively, or in addition, the processor is to decrypt a block of the data stored in the system memory, wherein a size of the block corresponds to a size of a block cipher's input or output, determine that entropy of plaintext in the decrypted block of the data is above a threshold level, and perform the correction command on each device in the system memory storing a portion of the block of the data. Alternatively, or in addition, the processor comprises logic to execute the correction command in a parallel pipeline, wherein the parallel pipeline comprises generating the second MAC with the replacement value for each device of the system memory. Alternatively, or in addition, the processor is to generate a block correction value. Alternatively, or in addition, the processor is to rekey the first MAC and the second MAC in response to expiration of a predetermined period of time.

Example 2

In one embodiment, a system for managing encrypted data comprises a processor to store an encrypted first block correction value based on data stored in system memory in response to a write operation to the system memory. The processor can also detect a read operation corresponding to the data stored in the system memory, and calculate a second block correction value based on the data stored in the system memory, the second block correction value calculated based on an XOR operation comprising plaintext data stored in the system memory. Additionally, the processor can determine that the second block correction value does not match a decrypted first block correction value, determine that a stored first MAC value does not match a calculated second MAC, and recalculate the second block correction value with a correction operation, wherein the correction operation comprises an XOR operation based on decrypted data stored in the system memory and a replacement value for a device of the system memory. Furthermore, the processor can decrypt the data stored in the system memory in response to detecting the recalculated second MAC matches the first block correction value, and transmit the decrypted data to a cache device.

Alternatively, or in addition, the processor is to generate a first MAC based on an XOR operation comprising cipher text data stored in the system memory. Alternatively, or in addition, the processor is to decrypt the data stored in the system memory and the first block correction value. Alternatively, or in addition, the system comprises a single device in the system memory to store the first block correction value.

Example 3

In one example, a method for managing encrypted memory comprises storing a first message authentication code (MAC) based on data being stored in system memory in response to a write operation to the system memory. The method can also include detecting a read operation corresponding to the data stored in the system memory, calculating a second MAC based on the data retrieved from the system memory, and determining that the second MAC does not match the first MAC. Additionally, the method can include recalculating the second MAC subsequent to a correction operation, wherein the correction operation comprises an XOR operation based on the data retrieved from the system memory and a replacement value for a device of the system memory. Furthermore, the method can include decrypting the data stored in the system memory in response to detecting the recalculated second MAC matches the first MAC, and transmitting the decrypted data to cache.

Alternatively, or in addition, the correction operation comprises recalculating the second MAC for a plurality of devices of the system memory. Alternatively, or in addition, the method includes executing the XOR operation for each of the plurality of devices, wherein the XOR operation is based on the replacement value and the data stored in each of the plurality of devices with one device excluded. Alternatively, or in addition, the method includes generating a non-correctable error in response to detecting the recalculated second MAC does not match the first MAC for each device of the system memory. Alternatively, or in addition, the method includes decrypting a block of the data stored in the system memory, wherein a size of the block corresponds to a size of a block cipher's input or output, determining that entropy of plaintext in the decrypted block of the data is above a threshold level, and performing the correction command on each device in the system memory storing a portion of the block of the data. Alternatively, or in addition, the method includes executing the correction command in a parallel pipeline, wherein the parallel pipeline comprises generating the second MAC with the replacement value for each device of the system memory. Alternatively, or in addition, the method includes generating a block correction value. Alternatively, or in addition, the method includes rekeying or re-encrypting based on a new key the first MAC and the second MAC in response to expiration of a predetermined period of time.

Example 4

In one embodiment, a method for managing encrypted data comprises storing an encrypted first block correction value based on data stored in system memory in response to a write operation to the system memory. The method can also include detecting a read operation corresponding to the data stored in the system memory, and calculating a second block correction value based on the data stored in the system memory, the second block correction value calculated based on an XOR operation comprising plaintext data stored in the system memory. Additionally, the method can include determining that the second block correction value does not match a decrypted first block correction value, determining that a stored first MAC value does not match a calculated second MAC, and recalculating the second block correction value with a correction operation, wherein the correction operation comprises an XOR operation based on decrypted data stored in the system memory and a replacement value for a device of the system memory. Furthermore, the method can include decrypting the data stored in the system memory in response to detecting the recalculated second MAC matches the first block correction value, and transmitting the decrypted data to a cache device.

Alternatively, or in addition, the method can include generating a first MAC based on an XOR operation comprising cipher text data stored in the system memory. Alternatively, or in addition, the method can include decrypting the data stored in the system memory and the first block correction value. Alternatively, or in addition, the method can include using a single device in the system memory to store the first block correction value.

Example 5

In one embodiment, a non-transitory computer readable media for managing encrypted memory comprises a plurality of instructions that, in response to execution by a processor, cause the processor to store a first message authentication code (MAC) based on data stored in system memory in response to a write operation to the system memory. The processor can also detect a read operation corresponding to the data stored in the system memory, calculate a second MAC based on the data retrieved from the system memory, and determine that the second MAC does not match the first MAC. Furthermore, the processor can also recalculate the second MAC subsequent to a correction operation, wherein the correction operation comprises an XOR operation based on the data retrieved from the system memory and a replacement value for a device of the system memory. Additionally, the processor can decrypt the data stored in the system memory in response to detecting the recalculated second MAC matches the first MAC, and transmit the decrypted data to cache.

Alternatively, or in addition, the correction operation comprises recalculating the second MAC for a plurality of devices of the system memory. Alternatively, or in addition, the processor is to execute the XOR operation for each of the plurality of devices, wherein the XOR operation is based on the replacement value and the data stored in each of the plurality of devices with one device excluded. Alternatively, or in addition, the processor is to generate a non-correctable error in response to detecting the recalculated second MAC does not match the first MAC for each device of the system memory. Alternatively, or in addition, the processor is to decrypt a block of the data stored in the system memory, wherein a size of the block corresponds to a size of a block cipher's input or output, determine that entropy of plaintext in the decrypted block of the data is above a threshold level, and perform the correction command on each device in the system memory storing a portion of the block of the data. Alternatively, or in addition, the processor comprises logic to execute the correction command in a parallel pipeline, wherein the parallel pipeline comprises generating the second MAC with the replacement value for each device of the system memory. Alternatively, or in addition, the processor is to generate a block correction value. Alternatively, or in addition, the processor is to rekey the first MAC and the second MAC in response to expiration of a predetermined period of time.

Example 6

In one embodiment, a non-transitory computer readable media for managing encrypted memory comprises a plurality of instructions that, in response to execution by a processor, cause the processor to store an encrypted first block correction value based on data stored in system memory in response to a write operation to the system memory. The processor can also detect a read operation corresponding to the data stored in the system memory, and calculate a second block correction value based on the data stored in the system memory, the second block correction value calculated based on an XOR operation comprising plaintext data stored in the system memory. Additionally, the processor can determine that the second block correction value does not match a decrypted first block correction value, determine that a stored first MAC value does not match a calculated second MAC, and recalculate the second block correction value with a correction operation, wherein the correction operation comprises an XOR operation based on decrypted data stored in the system memory and a replacement value for a device of the system memory. Furthermore, the processor can decrypt the data stored in the system memory in response to detecting the recalculated second MAC matches the first block correction value, and transmit the decrypted data to a cache device.

Alternatively, or in addition, the processor is to generate a first MAC based on an XOR operation comprising cipher text data stored in the system memory. Alternatively, or in addition, the processor is to decrypt the data stored in the system memory and the first block correction value. Alternatively, or in addition, the system comprises a single device in the system memory to store the first block correction value.

Although an example embodiment of the disclosed subject matter is described with reference to block and flow diagrams in FIGS. 1-11, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for managing encrypted memory comprising:
a processing unit to:
receive a read operation request associated with encrypted data stored in a system memory, the system memory comprising a first message authentication code (MAC) based on the encrypted data stored in the system memory;
derive, responsive to the read operation request, a second MAC based on the encrypted data;
determine whether the first MAC matches the second MAC;
decrypt, responsive to a determination that the first MAC does not match the second MAC, a block of the encrypted data stored in the system memory, wherein a size of the block corresponds to a size of a block cipher's input or output;
determine whether an entropy of plaintext in the decrypted block of the data is above a threshold level; and
perform, responsive to a determination that the entropy of the plaintext in the decrypted block of the data is above the threshold level, a correction operation on each device in the system memory storing a portion of the block of the encrypted data, wherein the correction operation comprises an XOR operation based on the encrypted data retrieved from the system memory and a replacement value for a device of the system memory.

2. The system of claim 1, wherein the correction operation comprises recalculating the second MAC for a plurality of devices of the system memory.

3. The system of claim 2, wherein the processing unit is to execute the XOR operation for each of the plurality of devices, wherein the XOR operation is based on the replacement value and the data stored in each of the plurality of devices with one device excluded.

4. The system of claim 1, wherein the processing unit is to generate a non-correctable error in response to detecting the second MAC does not match the first MAC for each device of the system memory.

5. The system of claim 1, wherein the processing unit comprises logic to execute the correction operation in a parallel pipeline, wherein the parallel pipeline comprises generating the second MAC with the replacement value for each device of the system memory.

6. The system of claim 1, wherein the processing unit is to generate a block correction value.

7. The system of claim 1, wherein the processing unit is to rekey the first MAC and the second MAC in response to expiration of a predetermined period of time.

8. The system of claim 7, wherein the processing unit is to rekey the first MAC and the second MAC based on a memory refresh rate, wherein the rekeying comprises:
detecting a second read operation;
comparing the first MAC with a previously stored key;
re-computing the first MAC with a new key; and
storing the first MAC encrypted with the new key in the system memory.

9. A system for managing encrypted data comprising:
a processor to:
derive, responsive to a read operation request associated with encrypted data stored in a system memory, a verification block correction value based on the encrypted data;
determine whether the verification block correction value matches an encrypted first block correction value based on the encrypted data stored in the system memory;
decrypt, responsive to a determination that the encrypted first block correction value does not match the verification block correction value, a block of the encrypted data stored in the system memory, wherein a size of the block corresponds to a size of a block cipher's input or output;
determine whether an entropy of plaintext in the decrypted block of the data is above a threshold level; and
perform, responsive to a determination that the entropy of the plaintext in the decrypted block of the data is above the threshold level, a correction operation on each device in the system memory storing a portion of the block of the encrypted data, wherein the correction operation comprises an XOR operation based on the encrypted data retrieved from the system memory and a replacement value for a device of the system memory.

10. The system of claim 9, wherein the processor is to generate the encrypted first block correction value based on an XOR operation comprising cipher text data stored in the system memory.

11. The system of claim 9, wherein the processor is to decrypt the data stored in the system memory and the encrypted first block correction value.

12. The system of claim 9, wherein the system comprises a single device in the system memory to store the encrypted first block correction value.

13. A method for managing encrypted memory comprising:
receiving a read operation request associated with encrypted data stored in a system memory, the system memory comprising a first message authentication code (MAC) based on the encrypted data stored in the system memory;
deriving, responsive to the read operation request, a second MAC based on the encrypted data;
determining whether the first MAC matches the second MAC;
decrypting, responsive to a determination that the first MAC does not match the second MAC, a block of the encrypted data stored in the system memory, wherein a size of the block corresponds to a size of a block cipher's input or output;
determining whether an entropy of plaintext in the decrypted block of the data is above a threshold level; and
performing, responsive to a determination that the entropy of the plaintext in the decrypted block of the data is above the threshold level, a correction operation on each device in the system memory storing a portion of the block of the encrypted data, wherein the correction operation comprises an XOR operation based on the encrypted data retrieved from the system memory and a replacement value for a device of the system memory.

14. The method of claim 13, wherein the correction operation comprises recalculating the second MAC for a plurality of devices of the system memory.

15. The method of claim 14 comprising executing the XOR operation for each of the plurality of devices, wherein the XOR operation is based on the replacement value and the data stored in each of the plurality of devices with one device excluded.

16. The method of claim 13, comprising generating a non-correctable error in response to detecting the recalculated second MAC does not match the first MAC for each device of the system memory.

17. The method of claim 13, comprising rekeying or re-encrypting based on a new key the first MAC and the second MAC in response to expiration of a predetermined period of time.

18. A non-transitory computer readable media for managing encrypted memory comprising a plurality of instructions that, in response to execution by a processor, cause the processor to:
receive a read operation request associated with encrypted data stored in a system memory, the system memory comprising a first message authentication code (MAC) based on the encrypted data stored in the system memory;
deriving, responsive to the read operation request, a second MAC based on the encrypted data;
determining whether the first MAC matches the second MAC;
decrypt, responsive to a determination that the first MAC does not match the second MAC, a block of the encrypted data stored in the system memory, wherein a size of the block corresponds to a size of a block cipher's input or output;
determine whether an entropy of plaintext in the decrypted block of the data is above a threshold level; and
perform, responsive to a determination that the entropy of the plaintext in the decrypted block of the data is above the threshold level, a correction operation on each device in the system memory storing a portion of the block of the encrypted data, wherein the correction operation comprises an XOR operation based on the encrypted data retrieved from the system memory and a replacement value for a device of the system memory.

19. The non-transitory computer-readable media of claim 18, wherein the correction operation comprises recalculating the second MAC for a plurality of devices of the system memory.

20. The non-transitory computer-readable media of claim 19, wherein the processor is to execute the XOR operation for each of the plurality of devices, wherein the XOR operation is based on the replacement value and the data stored in each of the plurality of devices with one device excluded.

21. The non-transitory computer-readable media of claim 18, wherein the processor is to generate a non-correctable error in response to detecting the recalculated second MAC does not match the first MAC for each device of the system memory.

* * * * *